United States Patent
Nichols et al.

(10) Patent No.: US 10,012,753 B2
(45) Date of Patent: Jul. 3, 2018

(54) MEASUREMENT COMPENSATION USING MULTIPLE ELECTROMAGNETIC TRANSMITTERS

(71) Applicant: SCHLUMBERGER TECHNOLOGY CORPORATION, Sugar Land, TX (US)

(72) Inventors: Edward Nichols, Berkeley, CA (US); Emmanuel Legendre, Sevres (FR); Jean-Luc Le Calvez, Orsay (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 136 days.

(21) Appl. No.: 14/784,597

(22) PCT Filed: Apr. 15, 2014

(86) PCT No.: PCT/US2014/034063
§ 371 (c)(1),
(2) Date: Oct. 15, 2015

(87) PCT Pub. No.: WO2014/172296
PCT Pub. Date: Oct. 23, 2014

(65) Prior Publication Data
US 2016/0070018 A1    Mar. 10, 2016

(30) Foreign Application Priority Data

Apr. 17, 2013   (EP) ..................................... 13305497

(51) Int. Cl.
*G01V 3/28*         (2006.01)
*E21B 47/00*      (2012.01)
(Continued)

(52) U.S. Cl.
CPC ................ *G01V 3/28* (2013.01); *E21B 47/00* (2013.01); *E21B 47/0905* (2013.01); *G01V 3/38* (2013.01)

(58) Field of Classification Search
CPC .. G01V 3/28; G01V 3/38; E21B 47/00; E21B 47/0905
(Continued)

(56) References Cited

U.S. PATENT DOCUMENTS 6,294,917 B1    9/2001   Nichols
7,960,969 B2    6/2011   Mouget et al.
(Continued)

FOREIGN PATENT DOCUMENTS

EP    1795920 A1    6/2007
EP    2270420 A1    1/2011

OTHER PUBLICATIONS

Extended European Search Report issued in corresponding EP Application No. 13305497.3 dated Nov. 7, 2013.
(Continued)

*Primary Examiner* — Jay Patidar
(74) *Attorney, Agent, or Firm* — Michael Dae (57) ABSTRACT

Systems, methods, and devices for compensating for environmental conditions on electromagnetic measurements are provided. For example, a downhole logging tool may include a first transmitter coil, a second transmitter coil, and a first receiver coil. The first transmitter coil may provide a first magnetic signal in a wellbore having a conductive casing. The second transmitter coil may provide a second magnetic signal in the wellbore. The first receiver may obtain a first measurement relating to the first magnetic signal and a second measurement relating to the second magnetic signal. The first receiver coil may be near enough to the first transmitter coil and the second transmitter coil to
(Continued)

obtain measurements predominantly in the near field eddy current regime. A ratio of the first measurement and the second measurement may cancel environmental dependencies of the first receiver coil.

17 Claims, 5 Drawing Sheets (51) Int. Cl.
*E21B 47/09* (2012.01)
*G01V 3/38* (2006.01)

(58) Field of Classification Search
USPC .................. 324/333–339, 220–221, 225
See application file for complete search history.

(56) References Cited

U.S. PATENT DOCUMENTS

| 8,165,825 | B2 | 4/2012 | Legendre et al. | |
|---|---|---|---|---|
| 8,456,166 | B2 * | 6/2013 | DePavia | G01V 3/28 324/333 |
| 8,829,908 | B2 * | 9/2014 | Roshtal | G01V 3/28 324/338 |
| 2003/0076107 | A1 | 4/2003 | Fanini et al. | |
| 2009/0091328 | A1 | 4/2009 | Clark et al. | |
| 2009/0195244 | A1 * | 8/2009 | Mouget | G01V 3/28 324/221 |

OTHER PUBLICATIONS

International Search Report and Written Opinion issued in corresponding International Application No. PCT/US2014/034063 dated Mar. 4, 2015.

International Preliminary Report on patentability issued in the related PCT application PCT/US2014/034063, dated Oct. 20, 2015 (7 pages).

* cited by examiner

MEASUREMENT COMPENSATION USING MULTIPLE ELECTROMAGNETIC TRANSMITTERS

BACKGROUND

This disclosure relates generally to electromagnetic downhole tools and, more particularly, to electromagnetic downhole tools having multiple transmitters to compensate for effects of environmental conditions on receiver circuitry.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Corrosion of wellbore casing is a natural phenomenon in the harsh environment of oil and gas production wells. In fact, such corrosion may be extremely costly, potentially exceeding billions of dollars. The casing therefore may be monitored to enable timely mitigation strategies to prevent leaks, environmental damages, and other failures. Various downhole tools have been developed to detect corrosion in well casing. In one example, pipe corrosion can be inferred from the measurement of the internal diameter and/or wall thickness of a pipe in a well. Mechanical calibers can provide the internal diameter. Ultrasonic tools can measure both the internal diameter and the thickness of a fluid-filled pipe. Electromagnetic (EM) tools can evaluate corrosion in single- and multiple-casing wells by determining metal loss and inner casing geometry based on the behavior of electromagnetic signals launched and received from transmitters and receivers located in an innermost tubing.

Considering electromagnetic (EM) tools in particular, these tools may use transmitter coils to excite eddy currents in the casing. The eddy currents in the casing generate corresponding magnetic fields. Receiver coils may measure the effect of the casing on the eddy currents to obtain certain properties of the casing. For example, the receiver coils may obtain near field measurements when a closely spaced transmitter coil excites high-frequency eddy currents to determine a transimpedance value, or Z-property, that corresponds to the internal diameter (ID) of the casing. Variations in the Z-property of the casing may indicate possible corrosion.

The receiver coils that obtain these measurements, however, may be susceptible to the harsh environmental conditions of the well that is being measured. Among other things, the receiver coils may obtain different measurements depending on both the magnitude of the current temperature, as well as a hysteresis of recent temperature changes. Although some techniques have been developed to calibrate the receiver coils to account for thermal drift, these calibrations may be very complex and, at times, may be less accurate than desired. Such calibrations may also be difficult because the thermally dependent components may be located in different regions of a downhole tool, each with its own thermal environment. The complexity of the calibrations may be compounded by relying on a thermal reference, which may be located in still a different thermal area. As a result, the ultimate Z-property measurements may be less accurate and/or less precise than desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of this disclosure include systems, methods, and devices for compensating for environmental conditions on electromagnetic measurements. In one embodiment, a downhole logging tool may include a first transmitter coil, a second transmitter coil, and a first receiver coil. The first transmitter coil may provide a first magnetic signal in a wellbore having a conductive casing. The second transmitter coil may provide a second magnetic signal in the wellbore. The first receiver may obtain a first measurement relating to the first magnetic signal and a second measurement relating to the second magnetic signal. The first receiver coil may be near enough to the first transmitter coil and the second transmitter coil to obtain measurements predominantly in the near field eddy current regime. A ratio of the first measurement and the second measurement may cancel environmental dependencies of the first receiver coil.

In another embodiment, a downhole logging system that obtains electromagnetic measurements relating to a Z-property of a conductive casing in a wellbore may include a sensor assembly and data processing circuitry. The sensor assembly may include at least a first receiver coil, a first transmitter coil, and a second transmitter coil. The sensor assembly may operate in a near field eddy current regime of the conductive casing in the wellbore. The first receiver coil may obtain a first measurement when the first transmitter coil provides a first signal and may obtain a second measurement when the second transmitter coil provides a second signal. Although the first measurement and the second measurement may depend at least in part on a temperature of the first receiver coil, the data processing circuitry may determine a value independent of the temperature that relates to a Z-property of the casing in the wellbore based at least in part on the first measurement and the second measurement.

In another embodiment, a method includes moving a downhole tool into a borehole with a conductive casing and obtaining at least two electromagnetic measurements. The first electromagnetic measurement may be obtained from a first receiver coil of the downhole tool when a first transmitter coil of the downhole tool outputs a first electromagnetic signal. The second electromagnetic measurement may be obtained from the first receiver coil of the downhole tool when a second transmitter coil of the downhole tool outputs a second electromagnetic signal. The first and second electromagnetic signal may have substantially the same frequency. The method also may include taking a ratio of the first electromagnetic measurement and the second electromagnetic measurement to reduce or eliminate dependencies of the first and second measurements to at least one environmental condition on the receiver coil.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This disclosure relates to a downhole tool to obtain a Z-property measurement of an inner diameter (ID) of a casing in a well. The Z-property measurement allows the determination of the surface transimpedance of the casing. Variations of the surface transimpedance may indicate, among other things, whether corrosion of the casing has occurred or whether other surface defects that affect the surface transimpedance are present. A downhole tool may obtain a Z-property measurement by exciting eddy currents into the casing of the well using a transmitter coil on the tool. A receiver coil may detect the magnetic fields caused by the eddy currents. The receiver coil may be spaced apart from the transmitter coil in accordance with a near field eddy current (NFEC) regime. The resulting near field measurements, when the eddy currents are excited by the transmitter coil at relatively high frequencies (e.g., frequencies higher than about 100 Hz), may correspond to the inner diameter (ID) of the casing. The receiver coils and related circuitry used to obtain the Z-property measurements may be subject to thermal drift and/or other phenomena due to environmental conditions, but the tool configuration and method of this disclosure may account for these environmental dependencies. Specifically, by using a ratio of measurements obtained on a particular receiver coil from excitations of the casing by two different transmitter coils, the dependence of the receiver sensor response on certain environmental conditions may be reduced or eliminated.

Figure 1:
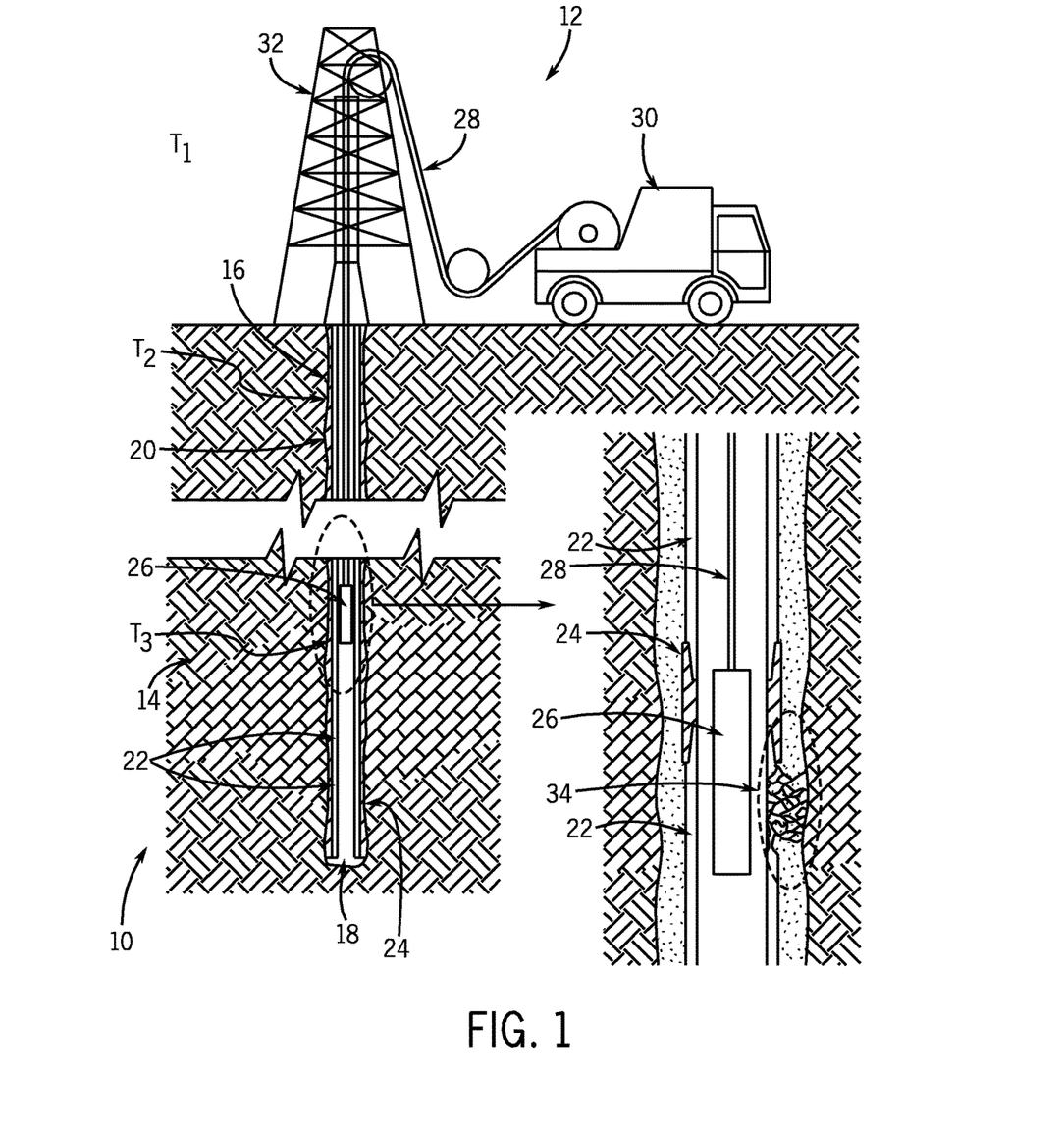
FIG. 1 is a schematic diagram of an electromagnetic corrosion detection system, in accordance with an embodiment.

Keeping this in mind, FIG. 1 schematically illustrates an electromagnetic well-logging system 10 to obtain such an environmentally compensated Z-property measurement. In particular, FIG. 1 illustrates surface equipment 12 above a geological formation 14. In the example of FIG. 1, a drilling operation has previously been carried out to drill a wellbore 16, to run a casing string 18, and to seal an annulus 20—the space between the wellbore 16 and the casing string 18—with cementing operations.

The casing string 18 may include several casing joints 22 (also referred to below as casing 22) coupled together by casing collars 24 to stabilize the wellbore 16. The casing joints 22 represent lengths of conductive pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form the casing string 18 to a suitable length and specification for the wellbore 16.

The casing joints 22 and/or collars 24 may be made of carbon steel, stainless steel, or other suitable materials to withstand a variety of forces, such as collapse, burst, and tensile failure, as well as chemically aggressive fluid. Nevertheless, in the harsh downhole environment of the wellbore 16, the casing joints 22 and collars 24 may still be subject to corrosion.

The surface equipment 12 may carry out various well logging operations to detect corrosion and other conditions. The well logging operations may measure parameters of the geological formation 14 (e.g., resistivity or porosity) and/or the wellbore 16 (e.g., temperature, pressure, fluid type, or fluid flowrate). Some measurements may obtained by a logging tool 26. In this disclosure, the logging tool 26 may measure a Z-property of the casing joints 22 or casing collars 24, but may additionally or alternatively carry out any other suitable measurements. Moreover, the example of FIG. 1 shows the logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the logging tool 26 may be conveyed using any other suitable conveyance, such as coiled tubing or a borehole assembly (BHA) used for logging while drilling (LWD).

The logging tool 26 may be deployed inside the wellbore 16 by the surface equipment 12, which may include a vehicle 30 and a deploying system such as a drilling rig 32. Data related to the geological formation 14 or the wellbore 16 gathered by the logging tool 26 may be transmitted to the surface, and/or stored in the logging tool 26 for later processing and analysis. In one example, the vehicle 30 may be fitted with a computer and software to perform data collection and analysis.

FIG. 1 also schematically illustrates a magnified view of a portion of the cased wellbore 16. As mentioned above, the downhole tool 26 may obtain Z-property measurements, which are measurements of the transimpedance of the casing 18. Certain variations in the transimpedance of the casing 18 may indicate the occurrence of a corrosion zone 34 affecting a casing joint 22. Thus, when the tool 26 provides such Z-property measurements to the surface equipment 12 (e.g., through the cable 28), the surface equipment 12 may ascertain the location of the corrosion zone 34. Based on the detection of the corrosion zone 34, the surface equipment 12 may run another downhole tool into the wellbore 16 to carry out an appropriate remedial treatment (e.g., chemical treatment, patch, or casing replacement) to consolidate the corroded casing joint 22.

To carry out the Z-property measurement, the downhole tool 26 may traverse various regions of the wellbore 16 with different environmental conditions. For example, different depths of the wellbore 16 may have higher or lower temperatures or pressures. Indeed, a temperature T1 at the surface equipment 12 may be lower than the temperatures experienced within the wellbore 16. A temperature T2 at a first depth in the wellbore 16 may be higher than the temperature T1 at the surface, and a temperature T3 at a second depth may be higher still. As the temperature and other environmental conditions change, these conditions may affect the output of the circuitry of the downhole tool 26, causing the measurements to vary depending on temperature and/or other environmental conditions. As will be discussed below, the downhole tool 26 may employ a configuration and technique involving a ratio of measurements that may largely eliminate some of these dependencies.

Before continuing, it may be recalled that the downhole tool 26 may detect signs of corrosion 34 on the inner diameter (ID) of the casing 22 using an electromagnetic (EM) measurement known as the Z-property measurement. In some embodiments, the downhole tool 26 may also obtain additional EM measurements. Such additional EM measurements may include, among other things, measurements relating to a remote-field eddy current (RFEC) regime to determine a wall thickness of the casing 22 and/or measurements associated with casing 22 imaging. However, this disclosure will focus on the Z-property measurement. Thus, while an actual implementation of the downhole tool 26 may include components to carry out a measurement relating to the remote-field eddy current (RFEC) regime, which may relate to the ratio of the wall thickness of the casing 22 to the skin depth of the casing 22, and/or components to perform imaging of the casing 22, these components are not included in the discussion of the downhole tool 26 below. Nevertheless, it should be understood that other embodiments of the downhole tool 26 may include components to carry out these other EM measurements.

Figure 2:
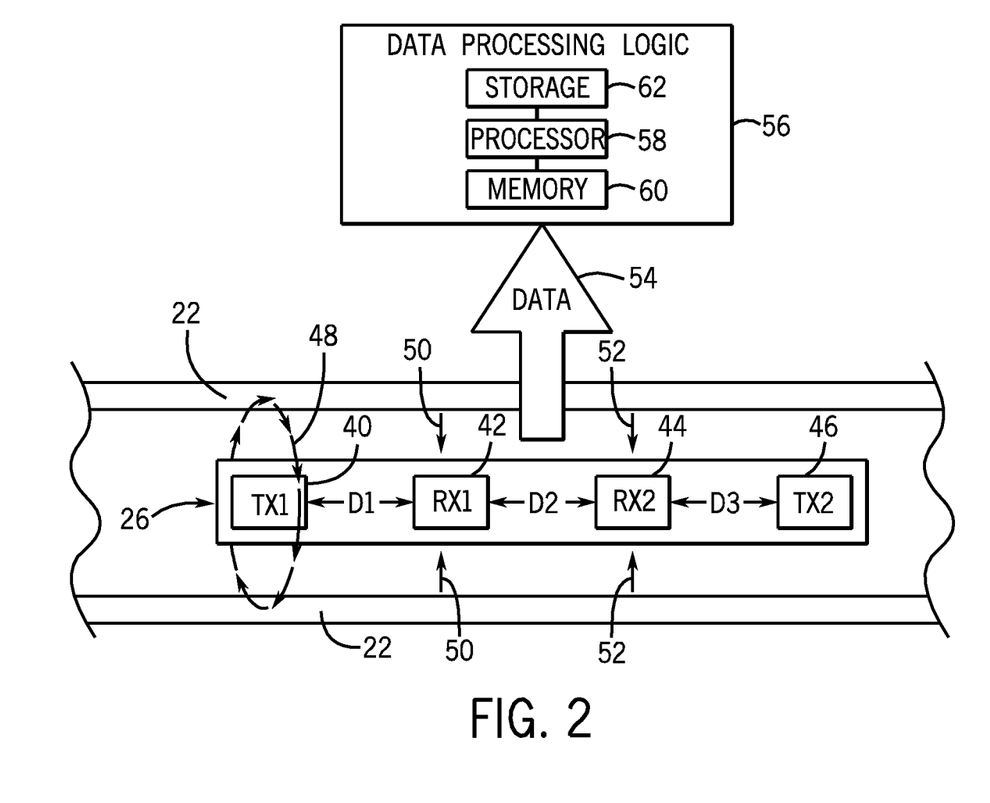
FIG. 2 is a block diagram of an electromagnetic downhole tool having two transmitter coils to compensate for environmental conditions on a receiver coil, in accordance with an embodiment.

With this in mind, FIG. 2 provides one example of the downhole tool 26 with components that carry out a Z-property measurement largely independent of the effects of environmental conditions. Specifically, the downhole tool 26 includes, among other things, a first transmitter coil TX1 40, a first receiver coil RX1 42, a second receiver coil RX2 44, and a second transmitter coil TX2 46. The transmitter coils TX1 40 and TX2 46 and the receiver coils RX1 42 and RX2 44 include conductive windings that can transmit and/or receive electromagnetic signal when current passes through the windings.

The first transmitter coil TX1 40, first receiver coil RX1 42, second receiver coil RX2 44, and second transmitter coil TX2 46 may be spaced apart from one another, from center to center, at distances D1, D2, and D3 as shown. These distances may be any suitable distances to obtain a Z-property measurement. Specifically, the spacings D1, D2, and D3 may be selected to support measurements in the near-field eddy current (NFEC) regime as opposed to the remote field eddy current (RFEC) regime. It may be appreciated that, in the near-field eddy current (NFEC) regime, the transimpedance or Z-property measurement is governed by the diameter, the electromagnetic properties, and the surface texture of the casing 22. In contrast, measurements obtained in the remote field eddy current (RFEC) regime may depend more heavily on the thickness of the casing 22. As such, to obtain a useful Z-property measurement, the spacing distances D1, D2, and D3 may be selected to be less than 2.5 times the diameter of the casing 22. For example, for many sizes of the casing 22 commonly used in hydrocarbon wells, the distance D1 may be between approximately 0.5 and 10 in., and may be approximately 1.5 in. in some embodiments; the distance D2 may be between approximately 0.5 and 10 in., and may be approximately 1.0 in. in some embodiments; and the distance D3 may be between approximately, 0.5 and 10 in. and may be approximately 1.5 in. in some embodiments.

In operation, a current signal may be pulsed through the windings of the transmitter coils TX1 40 and/or TX2 46, which creates a local magnetic field signal that induces eddy currents 48 to flow on the casing 22. These eddy currents 48 may themselves produce magnetic fields 50 and 52, which can be measured as voltage and/or current signals on the windings of the respective receiver coils RX1 42 and RX2 44. Differences between the magnetic field 50 and the original signal emitted by the transmitter coils TX1 40 and/or TX2 46 relate to the transimpedance, or Z-property, and also on the inner radius dimension of the casing 22. In addition, these differences may respond to eccentering and tilt of the measurement axis of the logging tool 26 within the casing 22.

To describe the Z-property measurement in another way, the principle operation of the components of the downhole tool 26 shown in FIG. 2 may be compared to a transformer with losses. The first transmitter coil TX1 40 or second transmitter coil TX2 46 may be analogized to a primary coil of a transformer, and the first receiver coil RX1 42 or the second receiver coil RX2 44 may be analogized to a secondary coil of a transformer. In contrast to a transformer, however, the downhole tool 26 does not include a mutual magnetic core to guide the magnetic blocks between the transmitter coils TX1 40 and/or TX2 46 and the receiver coils RX1 42 or RX2 44. Instead, the casing 22 acts as a guide of such magnetic flux. As a flux guide, however, the casing 22 is quite lossy owing to the eddy currents 48 induced in the metal of the casing 22. These losses result in attenuation and phase shifts between the signals output by the transmitter coils TX1 40 and/or TX2 46 and the received signals by the receiver coils RX1 42 and RX2 44. The phase shifts can be used to determine the geometrical and electromagnetic properties of the casing 22. Frequencies (or corresponding early measurement times in time domain analysis) are used for the measurement of the inner surface of the casing 22. These signals rapidly attenuate as they penetrate the casing 22, with the frequencies chosen so that skin depths in the metal are much less than 1 mm, the depth at which the em energy is attenuated by 1/e.

To measure the transimpedance of the surface of the casing 22, rather than the thickness of the casing 22, the alternating current (AC) signal provided through the windings of the transmitter coils TX1 40 and/or TX2 46 may have a frequency high enough to cause the eddy currents 48 to flow across the surface casing 22 but not to penetrate deeply into the casing 22. In one example, the AC signal on the transmitter coils TX1 40 and/or TX2 46 may be greater than 100 Hz. Moreover, the downhole tool 26 may obtain measurements for more than one frequency. For example, the transmitter coils TX1 40 and TX2 46 may emit a first signal of between approximately 10 and 10,000 Hz, which may be approximately 10 Hz, 100 Hz, 300 Hz, 600 Hz, 1 kHz, 2 kHz, 3 kHz, 6 kHz, or 10 kHz in some embodiments; a second signal of a higher frequency between approximately, 100 and 50,000 Hz, which may be approximately 100 Hz, 300 Hz, 900 Hz, 1.5 kHz, 3 kHz, 6 kHz, 15 kHz, 25 kHz, or 50 kHz in some embodiments; and a third signal of between approximately 1 and 1000 kHz, which may be approximately 1 kHz, 2 kHz, 5 kHz, 8 kHz, 14 kHz, 32 kHz, 94 kHz, 162 kHz, 348 kHz, 822 kHz, or 1 MHz in some embodiments. The particular frequencies selected may vary depending on the application, which may include, among other things, measuring scale thickness.

The measurement may also be done using a time domain approach. In the time domain approach, the logging tool 26 may record the response at the transmitter coils (e.g., TX1 40 and/or TX2 46) and various offset receiver coils (e.g., RX1 42 and/or RX2 44) to various combinations and superpositions of transmitter pulses and the received transient signals recorded after changes in the transmitter current. In some embodiments, the transmitter coil TX1 40 and/or TX2 46 can be used as the receiver RX1 42 and/or RX2 44 winding, with suitable electronics tasked to separate and optimize each function.

The signals collected by the receiver coils RX1 42 and RX2 44 may be converted into digital data 54 and provided to data processing logic 56. The data processing logic 56, which may include a processor 58, memory 60, and/or storage 62, may be located in the downhole tool 26 or at the surface equipment 12, or both. The processor 58, using instructions stored in the memory 60 and/or storage 62, may carry out the techniques described below to account for environmental conditions that affect the behavior of the circuitry of the receiver coils RX1 42 and RX2 44. The memory 60 and/or the storage 62 of the data processing logic 56 may be any suitable article of manufacture that can store the instructions. The memory 60 and/or the storage 62 may be read-only memory (ROM), random-access memory (RAM), flash memory, an optical storage medium, or a hard disk drive, to name a few examples.

The magnetic fields 50 and 52 resulting from the eddy currents 48 induced on the casing 22 may differ from the original signal output by the transmitter coils TX1 40 and/or TX2 46 in both magnitude and phase. The phase shift occurring between the transmitter coil TX1 48 current signal (I) and the voltage signal (V) detected by the first receiver coil RX1 42 and/or the second receiver coil RX2 44 is referred to as the phase of the transimpedance (Z) of the casing 22. The transimpedance Z may be described as according to the following equation:

$$Z = \frac{V}{I}, \quad (1)$$

which may be understood as similar to Ohm's law of $$R = \frac{V}{I}.$$

The term Z-property relates to the transimpedance, and refers to the measurement of the surface impedance of the casing 22, which may be defined as follows:

$$Z_{int} = \sqrt{2\frac{\mu}{\sigma}\omega}, \quad (2)$$

where μ is the magnetic permeability of the casing 22, σ is the electrical conductivity of the casing 22, and ω is equal to 2πf, where f is the frequency of the measured signal.

Transimpedance (Z) can also be defined as:

$$Z = \frac{V}{I} = A\exp(i\varphi), \quad (3)$$

where A represents the real amplitude and φ represents the relative phase. Thus, measuring the change in phase that occurs between transmitted and received signals may enable the determination of the transimpedance, or Z-property, of the casing 22.

To obtain a more accurate Z-property measurement, each transmitter coil TX1 40 and TX2 46 may provide signals of several different frequencies (e.g., 600 Hz, 1.5 kHz, and 14 kHz). The result on the casing 22 may be measured by the receiver coils RX1 42 and RX2 44, which are respectively apart from the TX1 40 and the TX2 46 at two different spacings. Thus, a total of twelve different measurements may be obtained.

Figure 3:
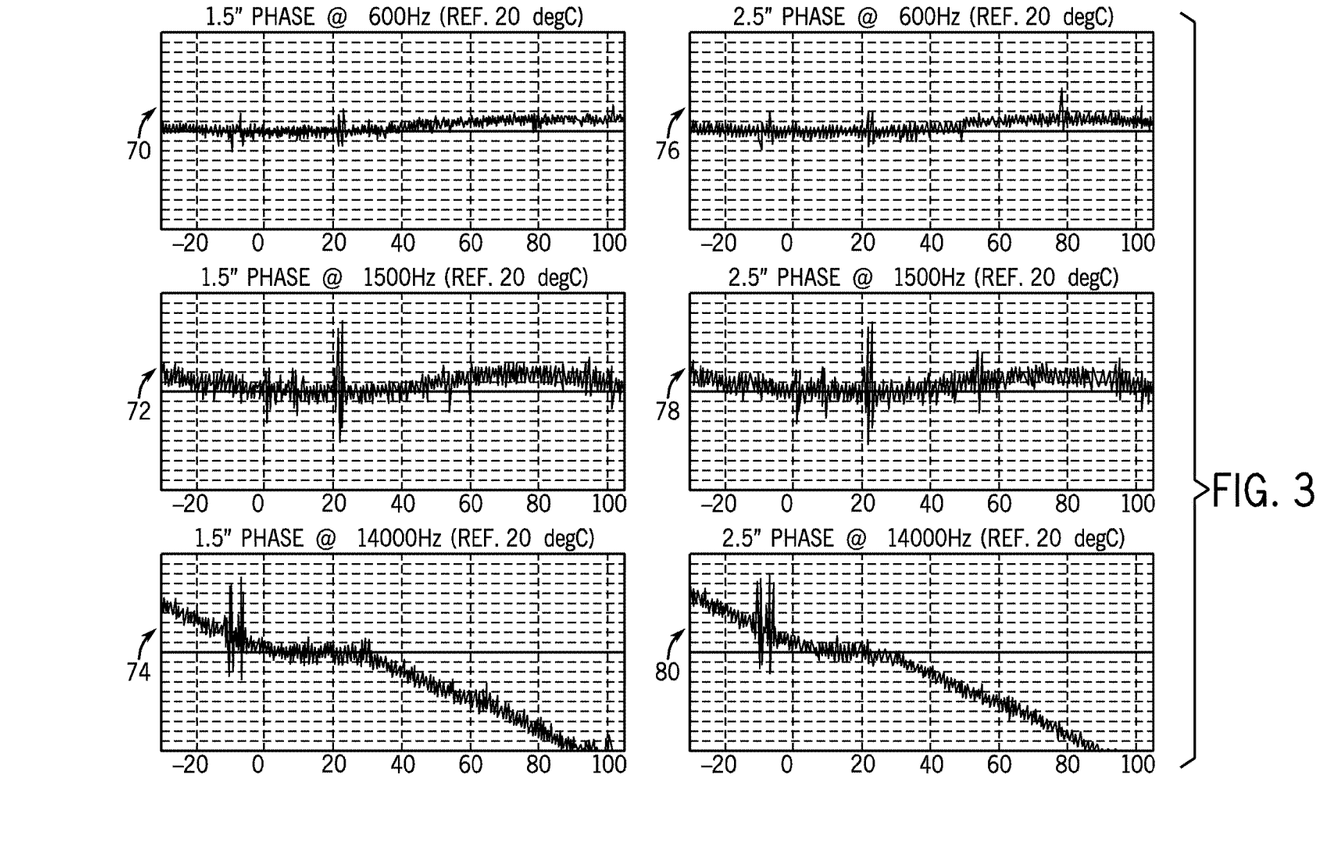
FIG. 3 represents a series of plots showing a relationship between measured electromagnetic phase change values and the temperature of the receiver coil circuitry, in accordance with an embodiment.

These individual measurements may depend on environmental conditions in the wellbore 16 that affect the circuitry of the receiver coils RX1 42 and/or RX2 44. For example, as seen in FIG. 3, phase changes indicated by the various measurements obtained by the receiver coils RX1 42 and/or RX2 44 may vary depending on the temperature of the receiver coils RX1 42 and/or RX2 44 and associated circuitry. In particular, FIG. 3 provides six plots of experimental data showing a dependency on phase change and temperature. Plots 70, 72, and 74 illustrate an amount of phase change due to temperature at a spacing of 1.5 in. (e.g., spacing D1) at three respective frequencies: 600 Hz, 1.5 kHz, and 14 kHz. Plots 76, 78, and 80 represent an amount of phase change due to temperature at a spacing of 2.5 in. (e.g., spacings D1 plus D2) at the three respective frequencies: 600 Hz, 1.5 kHz, and 14 kHz. In all of the plots 70, 72, 74, 76, 78, and 80, the phase change varies with temperature. It has also been noted that the environmentally induced phase change may have other dependencies, including the rate and/or direction of temperature change on the receiver coils RX1 42 and/or RX2 44 and associated circuitry. There are also similar environmental changes that can be happening in the transmitter coils TX1 40 and/or TX2 46 and other electronics that can be corrected by using the same ratio approach. The analysis proceeds assuming first there is no temperature effect at the transmitter coils TX1 40 and/or TX2 46 and then shows later how a double ratio approach will correct changes happening at both the receivers RX1 42 and/or RX2 44 and transmitters TX1 40 and/or TX2 46. The assumption is that the temperature effect changes very slowly compared to the measurement time and thus ratioing the measurements from the same transmitter TX1 40 or TX2 46 or receiver RX1 42 or RX2 44 removes the temperature dependent term.

Figure 4:
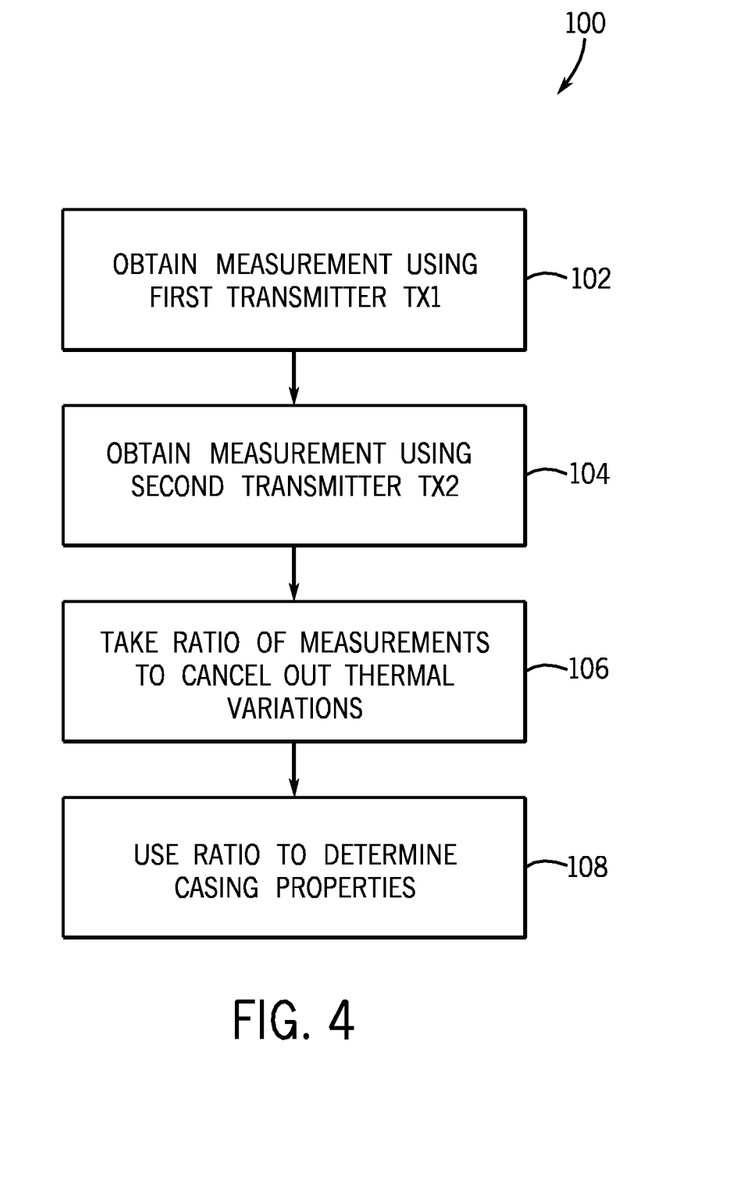
FIG. 4 is a flowchart of a method for obtaining an electromagnetic measurement compensated for certain borehole environmental conditions, in accordance with an embodiment.

To compensate for changes in temperature on the components of the downhole tool 26—as well to compensate for as any other environmental conditions that may alter the phase detected by the receiver coils RX1 42 and/or RX2 44 and associated circuitry, but which may not have been identified—ratios of measurements from signals from the two distinct transmitter coils TX1 40 and TX2 46 may be used. One example of such a method appears in a flowchart 100 of FIG. 4, which shows how to remove the receiver RX1 42 and/or RX2 44 thermal variation effect. The flowchart 100 may begin when a first measurement is obtained using the first transmitter coil TX1 40 and the receiver coils RX1 42 and/or RX2 44 (block 102). This first measurement may be characterized as dependent on the measurement frequency f as follows:

$$R_{T1}(f) = g(f) S_{T1}(f) e^{i\phi(f)} \quad (4),$$

where $R_{T1}(f)$ represents the received signal at the receiver (e.g., RX1 42) when the first transmitter coil TX1 40 provides the transmitted signal; $g(f)$ describes the temperature-dependent gain response of the electronics associated with the receiver (e.g., RX1 42); $\phi(f)$ describes the temperature-dependent phase response of the electronics associated with the receiver (e.g., RX1 42); and $S_{T1}(f)$ is the sensor output of the receiver (e.g., RX1 42), which is based on the response by the casing 22 to the signal emitted by the first transmitter coil TX1 40. The sensor output $S_{T1}(f)$ is believed to be substantially independent of the gain $g(f)$ or phase response $\phi(f)$. Since the gain $g(f)$ and phase response $\phi(f)$ are dependent on the electronics associated with the receiver (e.g., RX1 42), the gain $g(f)$ and phase response $\phi(f)$ are therefore also dependent on the environmental conditions impacting the electronics, including temperature. Note that the first measurement may be obtained with a first distance (e.g., D1) of spacing between the first transmitter coil TX1 40 and the receiver coil (e.g., RX1 42). As noted above, this first distance may be around 1.5 inches in some embodiments.

A second measurement may be obtained using the second transmitter coil TX2 46 and the first receiver coil RX1 42. This second measurement may be characterized as dependent on the measurement frequency f as follows:

$$R_{T2}(f) = g(f) S_{T2}(f) e^{i\phi(f)} \quad (5),$$

where $R_{T2}(f)$ represents the received signal at the receiver (e.g., RX1 42) when the second transmitter coil TX2 46 provides the transmitted signal and $S_{T2}(f)$ is the corresponding sensor output of the receiver (e.g., RX1 42). The variables $g(f)$ and $\phi(f)$ are the same in Equations 4 and 5, being dependent on the electronics associated with the receiver (e.g., RX1 42) and therefore also dependent on the environmental conditions impacting the electronics. Note that second first measurement may be obtained with a second distance (e.g., D2+D3) of spacing between the second transmitter coil TX2 46 and the receiver coil (e.g., RX1 42). As noted above, this second distance may be around 2.5 inches in some embodiments.

To cancel out thermal variations, as well as variations due to any other environmental factors that may impact the performance of the receiver coils RX1 42 and/or RX2 44, the data processing logic 56 may take a ratio of the two measurements of blocks 102 and 104 (block 106). As may be appreciated, corrections to remove the effects of thermal variations or variations due to other environmental factors may enable a more accurate and/or precise measurement than might otherwise be available. Taking a ratio of the measurements of blocks 102 and 104 may result in a ratio of sensor outputs independent of the environmentally varying factors. Thus, the data processing circuitry 56 may take the ratio of measurements of blocks 102 and 104 as follows:

$$\frac{R_{T1}(f)}{R_{T2}(f)} = \frac{g(f) S_{T1}(f) e^{i\phi(f)}}{g(f) S_{T2}(f) e^{i\phi(f)}}. \quad (6)$$

Note that the gain $g(f)$ due to the receiver coil (e.g., RX1 42) and the phase shift $\phi(f)$ due to the receiver coil (e.g., RX1 42) are multiplicative terms appearing in the numerator and denominator. As such, the ratio operation eliminates them, provided they are substantially identical. Thus, the data processing circuitry 56 may ultimately determine a ratio equal to the following:

$$\frac{R_{T1}(f)}{R_{T2}(f)} = \frac{S_{T1}(f)}{S_{T2}(f)}, \quad (7)$$

which includes substantially only the sensor outputs from the two measurements of blocks 102 and 104. The gain $g(f)$ due to the receiver coil (e.g., RX1 42) and the phase shift $\phi(f)$ due to the receiver coil (e.g., RX1 42) are expected to be equal, provided the temperature and/or other environmental conditions are the same for the receiver coil (e.g., RX1 42) for each successive reading. Thus, any suitable separation in time between taking the measurements of blocks 102 and 104 may be used, provided the temperature and/or other environmental conditions acting on the receiver coil (e.g., RX1 42) are substantially the same for both measurements. To provide one example, the temperature of the receiver coil (e.g., RX1 42) may be identical for both measurements when the measurements are obtained within a few hundred milliseconds and the temperature-change time gradient on the receiver coil (e.g., RX1 42) is relatively small.

Using this ratio, the data processing circuitry 56 may determine certain casing properties associated with the Z-property measurement (block 108). For instance, the ratio measurement may be used in a lookup table (LUT) in the storage 62 of the data processing circuitry 56, and/or a function relating properties of the casing 22 to the ratio determined at block 106 may be used to determine the properties of the casing 22. It should be appreciated that the lookup table and/or the function relating the ratio measurement to the casing 22 properties may be determined using computer modeling and/or using empirical data that has been obtained in the same manner described as above. Thus, among other things, such computer modeling and/or empirical data may take into account the impact of dividing measurements made at different spacings (e.g., 1.5 in. and a 2.5 in.). Determining the ratio as in block 106 may cause a change to the sensitivity of the inversion of the components of the downhole tool 26, but such a change may be modeled and/or predicted, allowing the optimization of the response sensitivity by choosing appropriate spacings for the desired range of casings.

This approach may be extended to address environmental changes happening in the transmitter TX1 40 and/or TX2 46 circuitry which may be different. Rewriting the terms $S_{T1}$ and $S_{T2}$ to show they apply to the receiver RX1 42 as $S_{1T1}$ and $S_{1T2}$, and explicitly including their own multiplicative gain and phase shift terms, the above equations may be set forth as follows:

$$S_{1T1}(f) = g_{T1}(f) e^{i\phi 1(f)} STR_{11}(f), \text{ for } RX1 \text{ from } TX1 \quad (8); \text{ and}$$

$$S_{1T2}(f) = g_{T2}(f) e^{i\phi 2(f)} STR_{12}(f), \text{ for } RX1 \text{ from } TX2 \quad (9).$$

Similar expressions can be applied for the receiver coil RX2 44 for the double pair of transmitters TX1 40 and TX2 46 to obtain:

$$S_{2T1}(f) = g_{T1}(f) e^{i\phi 1(f)} STR_{21}(f), \text{ for } RX2 \text{ from } TX1 \quad (10); \text{ and}$$

$$S_{2T2}(f) = g_{T2}(f) e^{i\phi 2(f)} STR_{22}(f), \text{ for } RX2 \text{ from } TX2 \quad (11).$$

The thermally dependent terms can be eliminated by forming the ratio of Equations $\{(8)/(9)\}/\{(10)/(11)\}$ as:

$$\frac{\left\{\frac{S_{1T1}(f)}{S_{1T2}(f)}\right\}}{\left\{\frac{S_{2T1}(f)}{S_{2T2}(f)}\right\}} = \frac{\left\{\frac{g_{T1}(f) e^{i\phi 1(f)} STR_{11}(f)}{g_{T2}(f) e^{i\phi 2(f)} STR_{12}(f)}\right\}}{\left\{\frac{g_{T1}(f) e^{i\phi 1(f)} STR_{21}(f)}{g_{T2}(f) e^{i\phi 2(f)} STR_{22}(f)}\right\}}.$$

Regrouping, we obtain:

$$\frac{\left\{\frac{S_{1T1}(f)}{S_{1T2}(f)}\right\}}{\left\{\frac{S_{2T1}(f)}{S_{2T2}(f)}\right\}} = \frac{\left\{\frac{g_{T1}(f) e^{i\phi 1(f)}}{g_{T2}(f) e^{i\phi 2(f)}}\right\}}{\left\{\frac{g_{T1}(f) e^{i\phi 1(f)}}{g_{T2}(f) e^{i\phi 2(f)}}\right\}} \cdot \left\{\frac{STR_{11}(f) STR_{22}(f)}{STR_{12}(f) STR_{21}(f)}\right\},$$

where the thermal gain and phase shift terms appear identically in numerator and denominator, and so can be eliminated to yield:

$$\frac{\left\{\frac{S_{1T1}(f)}{S_{1T2}(f)}\right\}}{\left\{\frac{S_{2T1}(f)}{S_{2T2}(f)}\right\}} = \left\{\frac{STR_{11}(f) STR_{22}(f)}{STR_{12}(f) STR_{21}(f)}\right\}.$$

As seen above, this expression has eliminated the undesired environmental effects from the measurement.

$$\frac{\left\{\frac{S_{1T1}(f)}{S_{1T2}(f)}\right\}}{\left\{\frac{S_{2T1}(f)}{S_{2T2}(f)}\right\}} = \left\{\frac{STR_{11}(f) STR_{22}(f)}{STR_{12}(f) STR_{21}(f)}\right\} = \left\{\frac{STR_{11}(f)}{STR_{12}(f)}\right\}^2$$

Figure 5:
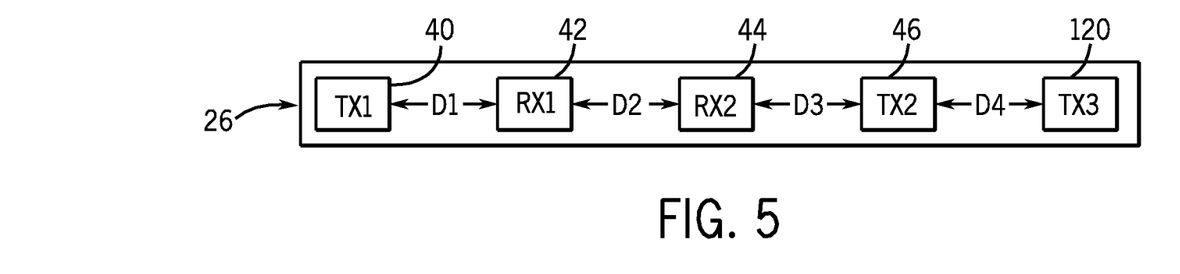
FIG. 5 is a block diagram of an electromagnetic downhole tool having three transmitter coils to compensate for environmental conditions on a receiver coil, in accordance with an embodiment.

It can be seen the choice of two transmitters coils TX1 40 and TX2 46 and receiver coils RX1 42 and RX2 44 as shown in FIG. 5, having the transmitter coils TX1 40 and TX2 46 at the end of the array, may be an optimal configuration because this provides two long spacing measurements (between TX1 40 and RX2 44 and between TX2 46 and RX1 42) and two short spacing measurements (between TX1 40 and RX1 42 and between TX2 46 and RX2 44). By contrast, if the receiver coils RX1 42 and RX2 44 and transmitter coils TX1 40 and TX2 46 were staggered, making either 3 short spacing measurements and 1 long spacing or 3 long spacing measurements and 1 short spacing measurement, this could decrease the stability of the inversion fitting. In other words, choosing the two transmitter coils TX1 40 and TX2 46 to bracket the receiver coils RX1 42 and RX2 44 enables the distances D1 and D3 to be equal, and hence the distance D1+D3=D2+D3. For this configuration, and if we assume slow depth variation of the inner surface relative to these distances, then the response $STR_{11}(f)=STR_{22}(f)$ and $STR_{12}(f)=STR_{21}(f)$. We can then simplify the ratio expression above to further improve inversion for surface impedance and inner radius of the casing. Still, it should be appreciated that other embodiments may employ staggered configurations of the receiver coils RX1 42 and RX2 44 and transmitter coils TX1 40 and TX2 46. A staggered configuration may not necessarily be optimal, but still may obtain useful data. In some staggered embodiments, additional environmental correction may used to improve the resulting signal.

Some other configurations of the downhole tool 26 may include additional transmitter coils. For example, as shown in FIG. 5, the downhole tool 26 may include a third transmitter coil TX3 120 in addition to the first transmitter coil TX1 40, the first receiver coil RX1 42, the second receiver coil RX2 44, and the second transmitter coil TX2 46. In one example, the spacing distances D1, D2, and D3 may be substantially the same as discussed above. An additional spacing distance D4 is illustrated as a distance between the second transmitter coil TX2 46 and the third transmitter coil TX3 120. The distance D4 may be between approximately 0.5 and 20 in., and may be approximately 1.2, 1.5, 1.8, 2.5, 3.0, 4.0, 6.0, 9.0, 12.5, 15.0, or 20.0 inches in some embodiments. The total distance D2+D3+D4—that is, the distance between the first receiver coil RX1 42 and the third transceiver TX3 120—may be approximately 4 in. in some embodiments. Additionally ratios of measurements may be obtained with the three transmitter coils TX1 40, TX2 46, and TX3 120, which may be used to improve the response of the downhole tool 26 to obtain Z-property measurements for a wider range of diameters and properties of the casing 22. Still more transmitter and receiver coils may be added in other embodiments of the downhole tool 26; each additional coil may allow the determination of another set of ratios obtained as discussed above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A downhole logging system configured to obtain electromagnetic measurements relating to a Z-property of a conductive casing in a wellbore, the system comprising:
   a first transmitter coil configured to provide, at a first time, a first magnetic signal of a first frequency in a wellbore having the conductive casing;
   a second transmitter coil configured to provide, at a second time, a second magnetic signal of the first frequency in the wellbore; and
   a first receiver coil configured to obtain:
      a first measurement, at the first time, of magnetic fields due at least in part to eddy currents flowing on the conductive casing that are caused at least in part by the first magnetic signal; and a second measurement, at the second time, of magnetic fields due at least in part to eddy currents flowing on the conductive casing that are caused at least in part by the second magnetic signal;

wherein the first receiver coil is near enough to the first transmitter coil and the second transmitter coil to obtain measurements predominantly in the near field eddy current regime, wherein the first measurement and the second measurement depend at least in part on a temperature of the first receiver coil; and data processing circuitry configured to determine a value independent of the temperature that relates to a Z-property of the casing in the wellbore based at least in part on the first measurement and the second measurement.

2. The downhole logging system of claim 1, wherein the first time and the second time are configured to take place sufficiently near to one another such that the first receiver coil is subject to approximately the same environmental conditions at the first time as the second time.

3. The downhole logging system of claim 1, wherein the first receiver coil is spaced a first distance from the first transmitter coil and a second distance from the second transmitter coil, wherein the second distance is greater than the first distance.

4. The downhole logging system of claim 3, wherein the first distance is between approximately 0.5-10 inches and the second distance is between approximately 0.5-10 inches.

5. The downhole logging system of claim 1, wherein the first receiver coil, the first transmitter coil, and the second transmitter coil are disposed generally longitudinally through a downhole logging tool, wherein the first receiver coil is disposed between the first transmitter coil and the second transmitter coil.

6. The downhole logging system of claim 1, wherein:
the first transmitter coil is configured to provide, at a third time, a third magnetic signal of a second frequency and, at a fourth time, a fourth magnetic signal of a third frequency;
the second transmitter coil is configured to provide, at a fifth time, a fifth magnetic signal of the second frequency and, at a sixth time, a sixth magnetic signal of the third frequency; and
the first receiver is configured to obtain:
a third measurement, at the third time, of magnetic fields due at least in part to eddy currents flowing on the conductive casing that are caused at least in part by the third magnetic signal;
a fourth measurement, at the fourth time, of magnetic fields due at least in part to eddy currents flowing on the conductive casing that are caused at least in part by the fourth magnetic signal;
a fifth measurement, at the fifth time, of magnetic fields due at least in part to eddy currents flowing on the conductive casing that are caused at least in part by the third magnetic signal; and
a sixth measurement, at the sixth time, of magnetic fields due at least in part to eddy currents flowing on the conductive casing caused that are at least in part by the sixth magnetic signal.

7. The downhole logging system of claim 1, wherein the first frequency is greater than or equal to approximately 100 Hz.

8. The downhole logging system of claim 7, wherein the first frequency is between approximately 10-10,000 Hz, the second frequency is between approximately 100-50,000 Hz, and the third frequency is between approximately 1-1000 kHz.

9. The downhole logging system of claim 1, comprising a second receiver coil also configured to obtain measurements at the first and second times of magnetic fields due at least in part to eddy currents flowing on the conductive casing that are caused at least in part by the first magnetic signal or the second magnetic signal.

10. The downhole logging system of claim 1, wherein the value relating to the Z-property comprises a ratio of the first measurement and the second measurement.

11. The downhole logging system of claim 10, wherein the data processing circuitry is configured to determine the Z-property of the casing using a lookup table that relates the ratio to the Z-property or a formula that that relates the ratio to the Z-property, or both.

12. The downhole logging system of claim 1, wherein the first measurement accords with the following relationship:

$$R_{T1}(f) = g(f) S_{T1}(f) e^{i\phi(f)},$$

where $R_{T1}(f)$ represents the first measurement, f represents a frequency of the first signal and the second signal, g(f) represents a temperature-dependent gain response of the first receiver coil, $\phi(f)$ represents a temperature-dependent phase response of the first receiver coil, and $S_{T1}(f)$ represents an output of the first receiver coil that is based on a response by the conductive casing to the first signal; and wherein the second measurement accords with the following relationship:

$$R_{T2}(f) = g(f) S_{T2}(f) e^{i\phi(f)},$$

where $R_{T2}(f)$ represents the second measurement, f represents the frequency of the first signal and the second signal, g(f) represents the temperature-dependent gain response of the first receiver coil, $\phi(f)$ represents the temperature-dependent phase response of the first receiver coil, and $S_{T2}(f)$ represents an output of the first receiver coil that is based on a response by the conductive casing to the second signal.

13. The downhole logging system of claim 1, wherein the first transmitter, second transmitter and first receiver and at least part of the data processing circuitry are disposed within a wireline downhole tool or a logging-while-drilling tool.

14. A method comprising:
moving a downhole tool into a borehole with a conductive casing; wherein the downhole tool comprises:
a first transmitter coil configured to provide, at a first time, a first magnetic signal of a first frequency in a wellbore having the conductive casing;
a second transmitter coil configured to provide, at a second time, a second magnetic signal of the first frequency in the wellbore; and
a first receiver coil configured to obtain:
a first electromagnetic measurement, at the first time, of magnetic fields due at least in part to eddy currents flowing on the conductive casing that are caused at least in part by the first magnetic signal; and
a second electromagnetic measurement, at the second time, of magnetic fields due at least in part to eddy currents flowing on the conductive casing that are caused at least in part by the second magnetic signal;
wherein the first receiver coil is near enough to the first transmitter coil and the second transmitter coil to obtain measurements predominantly in the near field eddy current regime;

obtaining the first electromagnetic measurement;

obtaining the second electromagnetic measurement; and taking a ratio of the first electromagnetic measurement and the second electromagnetic measurement to reduce or eliminate dependencies of the first and second measurements to at least one environmental condition on the receiver coil.

15. The method of claim 14, wherein the first electromagnetic measurement and the second electromagnetic measurement are obtained near enough in time to one another that the at least one environmental condition substantially does not vary between obtaining the first and second electromagnetic measurements.

16. The method of claim 14, comprising determining a Z-property measurement of the conductive casing using the ratio.

17. The method of claim 14, comprising:

obtaining a third electromagnetic measurement from a second receiver coil of the downhole tool when the first transmitter coil of the downhole tool outputs the first electromagnetic signal;

obtaining a fourth electromagnetic measurement from the second receiver coil of the downhole tool when the second transmitter coil of the downhole tool outputs the second electromagnetic signal, wherein the first and second electromagnetic signal have substantially the same frequency; and taking a ratio of:

the ratio of the first electromagnetic measurement and the second electromagnetic measurement; and a ratio of the third electromagnetic measurement and the fourth electromagnetic measurement;

wherein taking the ratio of the ratios reduces or eliminates dependencies of the first, second, third, and fourth measurements to the at least one environmental condition on the receiver coil and at least one environmental condition on the transmitter coil.

* * * * *